United States Patent
Chang et al.

(10) Patent No.: US 9,635,908 B2
(45) Date of Patent: May 2, 2017

(54) AUTOMATED TRIMMING OF PLIABLE ITEMS

(71) Applicant: Nike, Inc., Beaverton, OR (US)

(72) Inventors: Chih-Chi Chang, Douliu (TW); Cheng-Yen Ho, Taichung (TW); Mike F. Quigley, Orange City, FL (US); Shu-Hui Wang, Douliu (TW)

(73) Assignee: NIKE, Inc., Beaverton, OR (US)

( * ) Notice: Subject to any disclaimer, the term of this patent is extended or adjusted under 35 U.S.C. 154(b) by 547 days.

(21) Appl. No.: 14/058,685

(22) Filed: Oct. 21, 2013

(65) Prior Publication Data
US 2015/0107033 A1 Apr. 23, 2015

(51) Int. Cl.
| | | |
|---|---|---|
| G06F 19/00 | (2011.01) | |
| A43D 119/00 | (2006.01) | |
| A43D 27/00 | (2006.01) | |
| B23K 26/03 | (2006.01) | |
| G05B 19/401 | (2006.01) | |

(52) U.S. Cl.
CPC .......... *A43D 119/00* (2013.01); *A43D 27/00* (2013.01); *B23K 26/032* (2013.01); *G05B 19/401* (2013.01); *A43D 2200/60* (2013.01); *G05B 2219/36048* (2013.01); *G05B 2219/36251* (2013.01); *G05B 2219/37555* (2013.01); *G05B 2219/45243* (2013.01)

(58) Field of Classification Search
CPC .... A43D 119/00; A43D 27/00; B23K 26/032; G05B 2219/37555; G05B 2219/36251; G05B 2219/45243; G05B 2219/36048
USPC .......................................................... 700/134
See application file for complete search history.

(56) References Cited

U.S. PATENT DOCUMENTS

| | | | | |
|---|---|---|---|---|
| 4,583,181 A | * | 4/1986 | Gerber .................. | A41H 43/00 250/559.46 |
| 4,982,437 A | * | 1/1991 | Loriot ................... | B26D 5/005 356/71 |
| 5,205,232 A | | 4/1993 | Sadeh et al. | |
| 5,258,917 A | * | 11/1993 | Bruder ................. | B23K 26/032 348/125 |
| 5,663,885 A | * | 9/1997 | Stahl ....................... | B26D 5/00 700/131 |
| 5,953,232 A | * | 9/1999 | Blaimschein ........... | B26D 5/00 382/111 |

(Continued)

OTHER PUBLICATIONS

International Search Report with Written Opinion dated Jan. 30, 2015 in PCT Application No. PCT/US2014/059290, 11 pages.

(Continued)

*Primary Examiner* — Nathan Durham
(74) *Attorney, Agent, or Firm* — Shook, Hardy & Bacon L.L.P.

(57) ABSTRACT

The present invention relates to the automated cutting of pliable items. More particularly, the present invention relates to the automatic cutting and/or trimming of pliable items, such as a shoe upper that lacks uniformity. An image of the pliable item is captured having image features and a pattern is retrieved having pattern features, such as a proposed cut path. An image feature is compared to distance tolerances associated with pattern features to adjust the proposed cut path such that it satisfies the distance tolerances while providing a consistently sized and shaped trimmed item.

20 Claims, 11 Drawing Sheets

(56) References Cited

U.S. PATENT DOCUMENTS

| | | | | |
|---|---|---|---|---|
| 5,975,743 | A | * | 11/1999 | Bercaits ............... B26D 5/00 700/134 |
| 6,205,370 | B1 | | 3/2001 | Blaimschein et al. |
| 6,314,334 | B1 | * | 11/2001 | Berlin ............... G06Q 10/043 700/134 |
| 6,434,444 | B2 | * | 8/2002 | Herman, Jr. ............ B26D 5/00 382/111 |
| 6,520,057 | B1 | * | 2/2003 | Steadman ............ B26D 5/00 700/134 |
| 8,433,435 | B2 | * | 4/2013 | Fagan ............... B23K 7/105 219/121.69 |
| 2005/0137726 | A1 | | 6/2005 | Kuhnert |
| 2007/0293975 | A1 | * | 12/2007 | Hama ............... B26D 5/00 700/134 |
| 2013/0131853 | A1 | | 5/2013 | Regan et al. |

OTHER PUBLICATIONS

International Preliminary Report on Patentability dated May 6, 2016 for International Patent Application No. PCT/US2014/059290, 8 pages.

\* cited by examiner

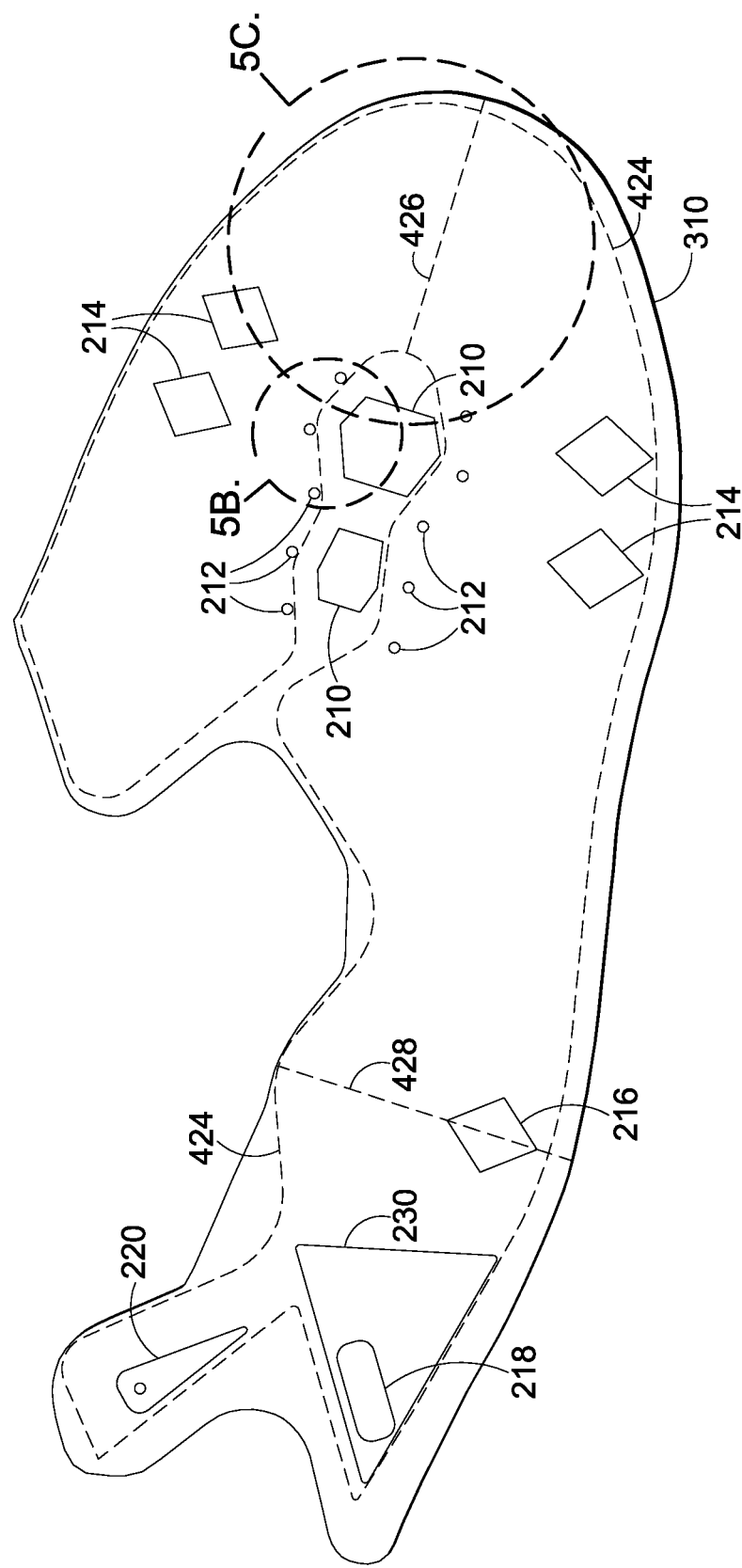

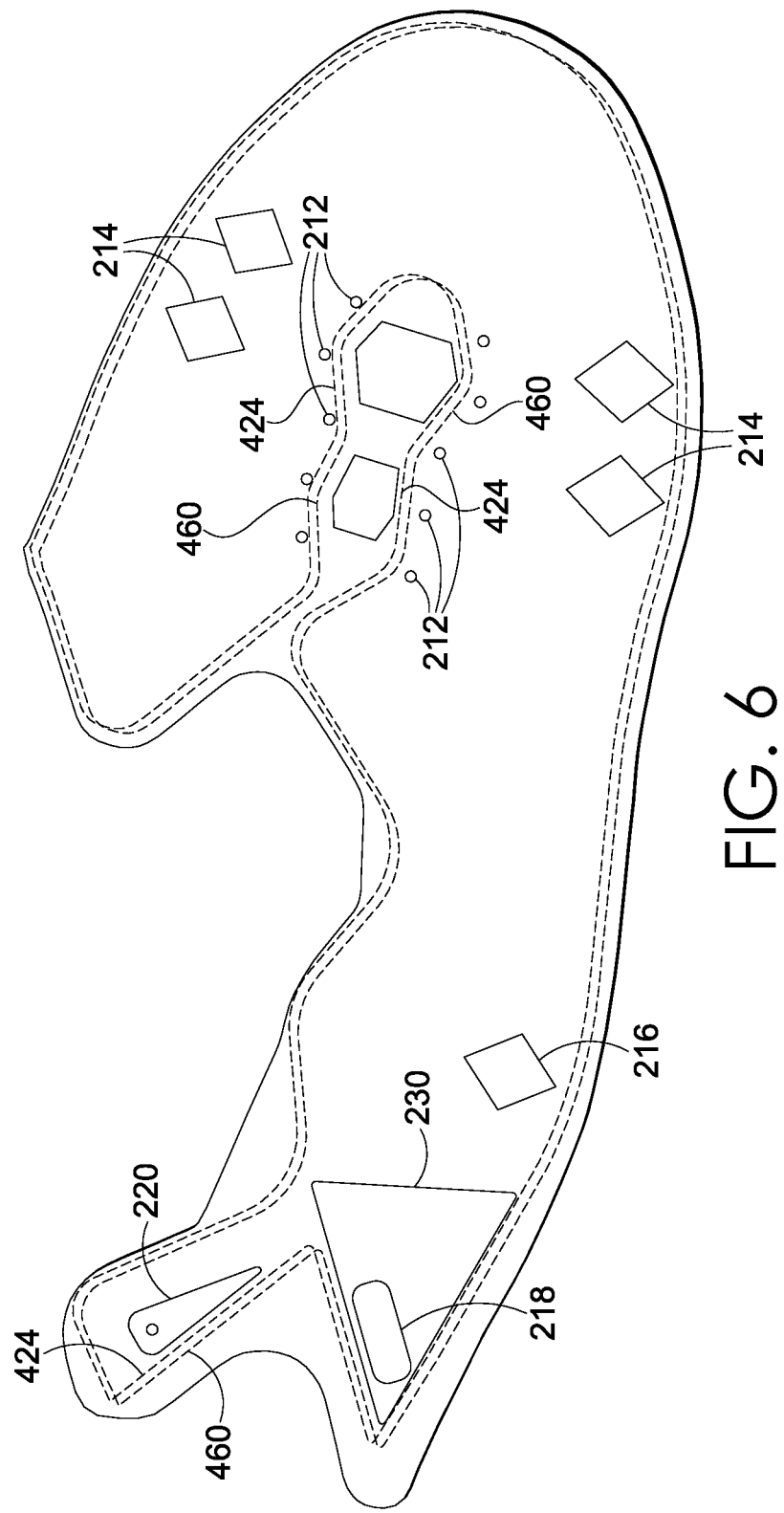

AUTOMATED TRIMMING OF PLIABLE ITEMS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to the automated processing of pliable items. More particularly, the present invention relates to the automatic cutting and/or trimming of pliable items, such as individual components of a shoe upper that are being prepared for further assembly into a completed shoe upper or shoe.

BACKGROUND OF THE INVENTION

Due to the innate flexibility and variation of pliable materials, automated processing of materials typically found in shoe uppers and other soft goods is difficult. Identifying various flexible components using automated systems and then performing operations upon any component has presented challenges. The inputs, such as a portion of an article of footwear, to a manufacturing process may lack conformity while the output of the process is generally desired to have conformity. Achieving conformity while taking into consideration variables of the input presents challenges as the manufacturing process scales such that a standardized operation that is universally applied to all inputs is not generally effective.

BRIEF SUMMARY OF THE INVENTION

The disclosed technology generally relates to the automated processing of pliable components for a shoe or soft good. For example, components for ultimate assembly into a shoe upper may be formed from textiles (knit or woven), leathers, synthetic leathers, sheet materials, membranes, or some combination of different types of materials that are pliable to at least some degree. Because these materials may have a tendency to fold and bend, automated processing of such components may be challenging. Additionally, layers of these flexible components are often used, and the stacking and attachment of the components is a source of variability that presents challenges. Further, such pliable materials may involve a degree of natural variance that can be challenging to address in an automated processing system. The complicated nature of many modern shoe uppers, often with a large number of components and small tolerances, further exacerbates these challenges, as a small variation in one component to be assembled into the upper can lead to cascading effects that undermine the performance of the assembled shoe upper, render the completed shoe upper highly unattractive, or simply prevent the successful assembly of the part into a shoe upper.

Systems and methods disclosed herein permit the automated processing and, more particularly, trimming of pliable components for use in the assembly of a soft good such as a shoe upper. For example, the disclosed systems and methods may trim pliable items that are components that will ultimately be assembled into a shoe upper. It is contemplated that a pre-trimmed component, such as a substantially planar shoe upper, may be non-uniform in shape and assembly to similarly constructed pre-trimmed components. However, in a manufacturing environment, the trimming operation may be performed to achieve a standardized size and shape of the trimmed component from the variably sized and shaped pre-trimmed components. As such, aspects may take inconsistent inputs, such as variably sized, shaped, or oriented shoe uppers, and perform a trimming operation on those inputs to result in a substantially normalized output, such as a trimmed shoe upper. While each trimmed output may have variations in the appearance or location of one or more incorporated features thereon, the resulting overall size and shape of the trimmed output may be consistent among the outputs, in an exemplary aspect.

Such a system and/or method may include an image capturing device, such as a camera, that captures an image of a pliable item. The pliable item may be, for example, a component of a shoe upper that has previously been cut or otherwise formed to an approximate size and shape that may, or may not, roughly correspond to the final size and shape desired for a trimmed component. The pliable item processed may be held on a surface that holds the pliable item in an extended, planar fashion to expose the pliable item to the camera when the image is captured. The camera may be located at a fixed or variable location relative to the retaining surface and the pliable item on the retaining surface, permitting the camera to capture the image. The retaining surface may apply suction or another force, if desired, to maintain the pliable item in a substantially flat and/or extended position. The system and method may further utilize a lighting system to illuminate the pliable item to better capture the image. The spectrum emitted by the lighting system may be selected to correspond to the reflectivity of materials used in all or part of the pliable item, as well as to enhance the detectability of features in the pliable item, contrast between features or other aspects of the pliable item, contrast between the pliable item and the retaining surface, etc.

The system for trimming further includes retaining at least one pattern representation in a memory system. The pattern representation may correspond to the pliable item being processed. The memory system may be maintained in a computer readable memory accessible by a computing system with a processer executing computer readable instructions to perform methods and/or to operate systems. Further, a pattern representation may identify at least one critical feature expected to be found in an image of a pliable item. A critical feature may be located within the interior and/or perimeter of a pliable item. The critical features may be used to identify the type of item in an image (for example, which component of a shoe upper an item in an image may be) and/or to generate a proposed trimming path relative to those features. A pattern representation may define more than one critical feature for potential identification and trimming path generation.

A processing system, such as a computing system, may compare the captured image of the pliable item to pattern representations to identify features within the image of the pliable item. The same or a different processing system may generate a proposed cutting path to trim the pliable item based upon the features identified in the image of the pliable item. Once a proposed cutting path has been generated, the processing system compares the proposed cutting path to distance tolerances associated with one or more of the critical features. The processing system then generates a final cutting path that satisfies all, or at least some, distance tolerances. A cutting system may then be moved along the final cutting path to trim the pliable item. A cutting system may comprise a laser generator or laser source that applies a laser to the pliable item, a drag knife, a water jet system, a cutting die, or any other mechanism capable of cutting the pliable item. Different types of pliable materials may benefit from the use of different cutting systems. The distance between a cutting system and a pliable item may be varied in accordance with systems and methods of the present invention. For example, a laser generator, a laser source, water jet, and other types of cutting systems may perform optimally when located at specific distances or within a range of distances from a pliable item. For example, a laser generator or a water jet nozzle may need to be maintained within a given range of distances from a pliable item for optimal cutting along a cutting path. However, a layered pliable item and/or natural variations in the distance between a pliable item and a cutting system due to flexing or variation in materials may require the distance between a cutting system and a pliable item to be detected and dynamically adjusted while the cutting system proceeds along the determined cutting path. Distances between the pliable item and a cutting system may be adjusted by moving the cutting system, moving a retaining surface, or both. In some examples, the distances may be adjusted to result in non-optimal cutting, for example to only partially cut an edge. The distances may also be varied while a cutting system is positioned at a single point relative to a pliable item, for example to sequentially cut through thick material. Further, the angle between the surface of a pliable item and a cutting system need not be perpendicular and may vary along a cutting path, for example to bevel an edge.

BRIEF DESCRIPTION OF THE SEVERAL VIEWS OF THE DRAWING

The present invention is described in detail below with reference to the attached drawing figures, wherein:

FIG. 5A illustrates an example of the pattern representation overlaid on the captured image to generate a proposed cutting path;

FIG. 6 illustrates the proposed cutting path and an adjusted final cutting path based upon a comparison of critical features located on the captured image to the proposed cutting path;

DETAILED DESCRIPTION OF THE INVENTION

Systems and methods are disclosed that utilize an image capturing device to capture an image of one or more pliable items to be trimmed. The pliable item may be retained in an extended position on a retaining surface while illuminated by a lighting source as the image is captured. A processing system is used to identify at least one critical image feature within the captured image. A pattern representation corresponding to the captured image is used to identify at least one of the pliable item, a critical image feature associated with the pliable item, a corresponding proposed cut path for the pliable item, or a critical pattern feature. A processing system overlays the proposed cut path onto the captured image and compares a critical image feature to predetermined tolerances associated with at least a critical pattern feature of the identified pattern. Based on this comparison, the processor generates an adjusted final cut path that satisfies one or more of the predetermined tolerances. A cutting system is then used to trim the pliable item along the generated final cut path.

Figure 1:
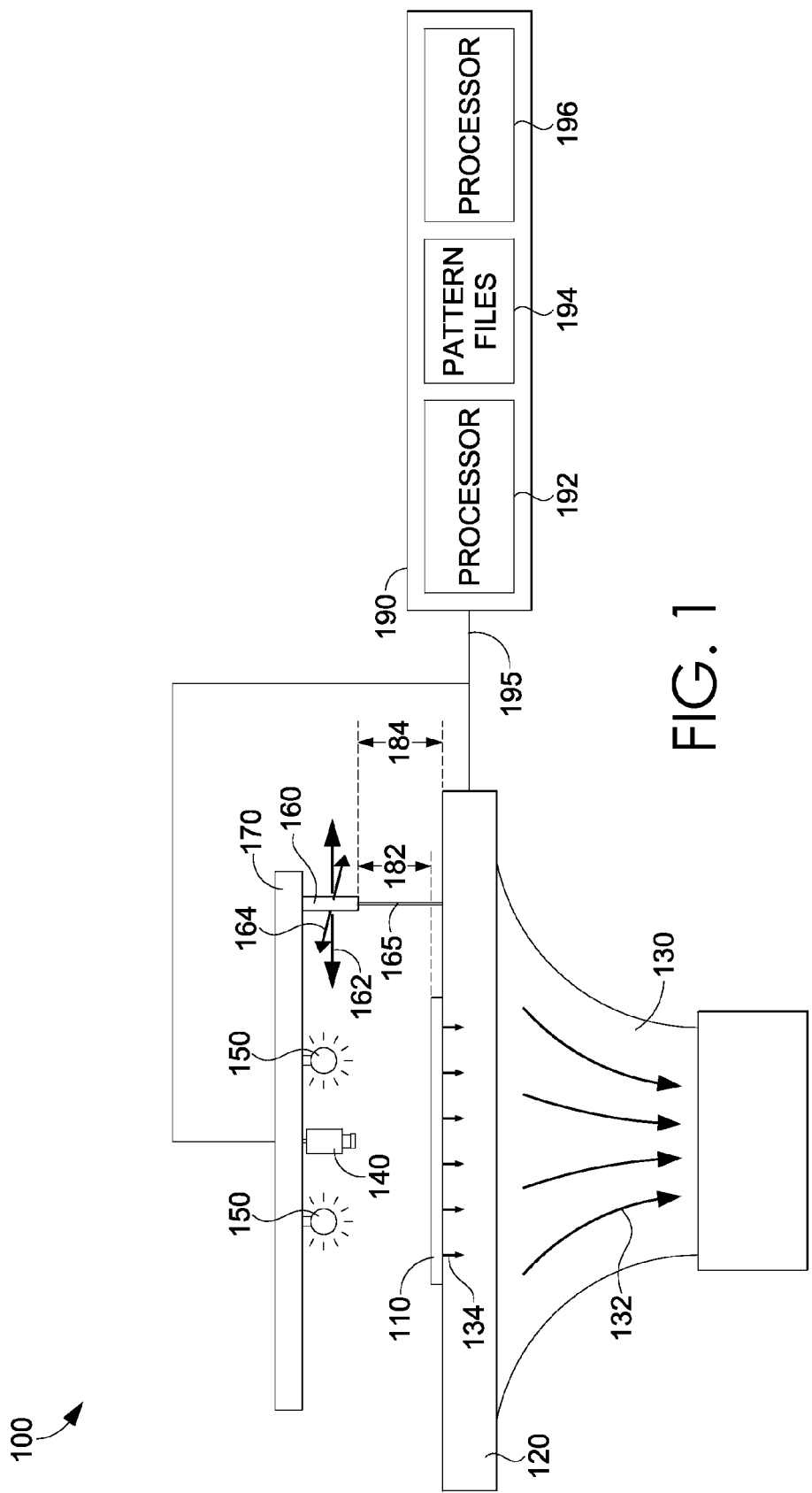
FIG. 1 is a schematic representation of a system in accordance with the present invention.

Referring now to FIG. 1, an example system 100 is illustrated. A pliable item 110 may comprise a textile, sheet material, membrane, natural or synthetic leather, or other materials. Pliable item 110 may be formed from multiple materials combined by stitching, adhesives, welding, etc. If pliable item 110 has been formed from multiple materials, some of those materials may be rigid. In particular examples, pliable item 110 may be a component part of a shoe upper. In the example of FIG. 1, pliable item 110 is retained on a retaining surface 120. Retaining surface 120 may permit a vacuum 130 to apply suction 132 to pliable item 110 to retain pliable item 110 downward as indicated by arrows 134 to hold pliable item 110 in an extended position. While the example system 100 shown in FIG. 1 uses a vacuum 130 to retain pliable item 110 in an extended position, it is contemplated that vacuum 130 could be omitted entirely, or may be replaced with an electro-static system, a magnetic system, a blower system, clamps or clips, or any other system or mechanism to hold a pliable item 110 in an extended fashion.

At least one image capturing device 140 is used to capture one or more images of pliable item 110 when held in an extended position on surface 120. Device 140 may be, for example, a camera. The camera may be matched to a light source, such that the camera is effective for capturing electromagnetic radiation in the spectrum reflected or emitted from the pliable item 110. Other imaging examples, without limitation, may include IR-based, UV-based, and ultra-sonic based systems. Camera 140 may be moveable or fixed relative to retaining surface 120. One or more lighting sources 150 may provide illumination to pliable item 110 while camera 140 captures images. The spectrum emitted by light source 150 may be selected to correspond with the reflective properties anticipated for a pliable item 110, for features within pliable item 110, for the surface 120, etc. For example, a lighting source 150 may illuminate pliable item 110 with light having a wavelength that will particularly reflect off of a given feature that may be detected by the camera 140, thereby facilitating the identification of one or more features within an image of a pliable item 110. A specific lighting source may be omitted in exemplary aspects.

A cutting system, such as a laser source 160, is positioned along a first axis 162 and a second axis 164 by a positioning system 170. Positioning system 170 may be, for example, an x-y table. First axis 162 and second axis 164 typically extend substantially parallel to surface 120. The cutting system 160 may be located at a distance 184 from the surface 120 and a distance 182 from the pliable item 110, which may differ based on the thickness of pliable item 110, and which may be variable at different positions relative to pliable item 110. The relative location of surface 120 and cutting system 160 may be varied to maintain the distance between a cutting system 160 and the pliable item 110 within a desired range and/or to achieve a desired type of cut. For example, a laser source 160 may be selectively positioned such that an emitted laser beam 165 interfaces with the surface of pliable item 110 at a desired range.

A computing system 190 may be connected via a connection 195 to various components of system 100. Computing device 190 includes one or more processing units and computer readable memory that may retain data (such as pattern representations or files, image files and the like) and/or computer executable code to cause a processing unit to execute a method and/or to control all or part of the operation of the system. Computing system 190 may include one or more units, and may comprise distributed components. Computing system 190 may, for example, retain one or more pattern files 194 within a computer readable memory. A processing unit 192 may compare pattern files 194 within computer readable memory to images captured by camera 140. Further, a processing unit 196 (which may be the same as processing unit 192, but need not be) may generate a cutting path for the cutting system 160 to trim a pliable item 110 based upon the identification of features within a pliable item 110 based upon a pattern file 194 retained in computer readable memory. Processing unit 192 and/or 196 may operate by executing instructions stored in a computer executable code stored on computer readable media within computing system 190 or accessible by computing system 190.

Computing system 190 typically includes a variety of computer-readable media. Computer-readable media can be any available media that can be accessed by computing system 190 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Figure 2:
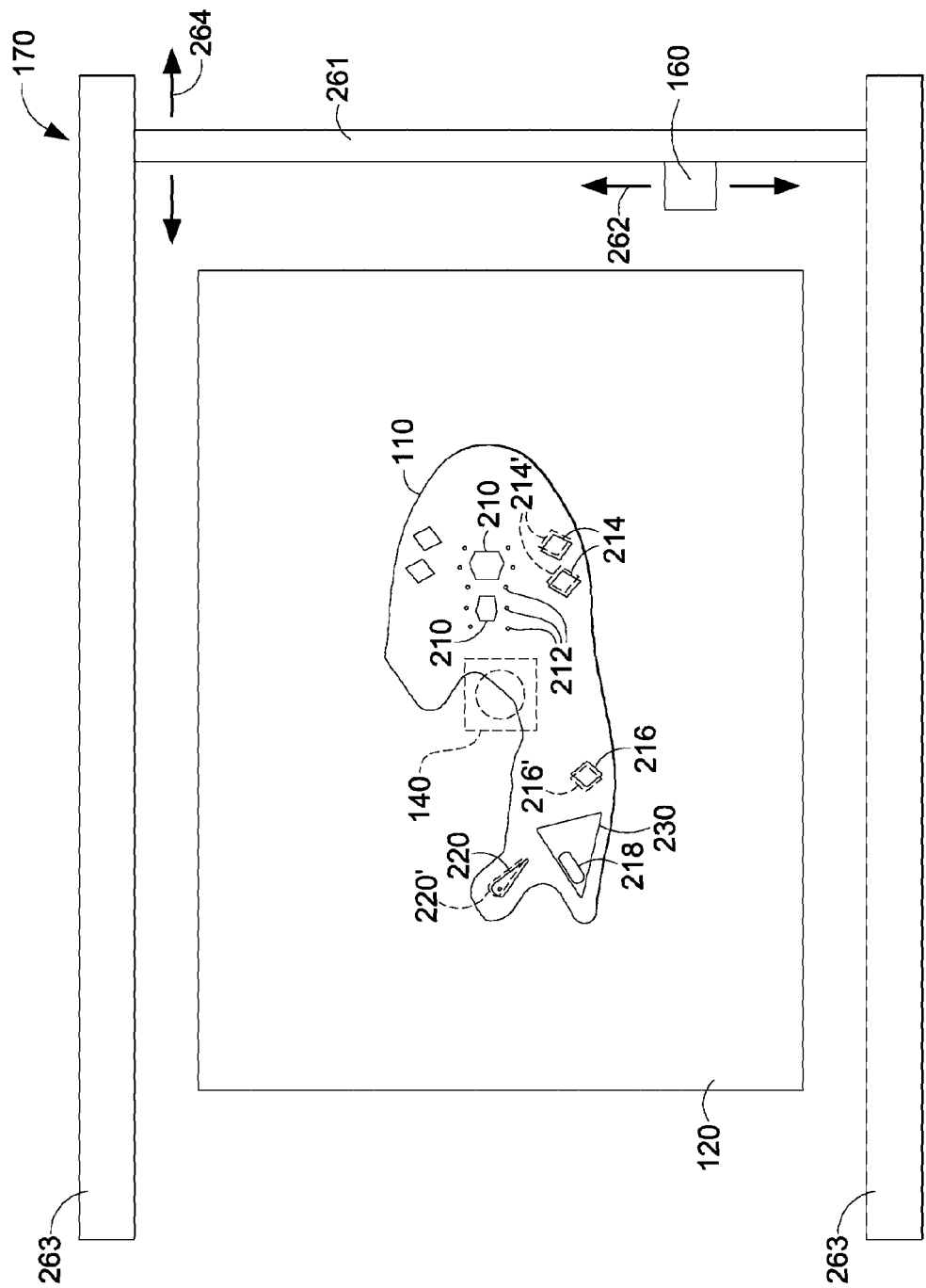
FIG. 2 is a schematic, partial top view of the system of FIG. 1, illustrating a pliable item on a retaining surface.

Referring now to FIG. 2, surface 120 may hold pliable item 110 in a substantially planar orientation. Any number of pliable items, of the same or different types and/or sizes, may be retained by surface 120 at a single time. Computing system 190 may use the captured image to compare to a pattern representation, file or other data to determine what type of part is shown in a given image and to ultimately generate a cutting path to trim that part. In particular, FIG. 2 illustrates pliable item 110 with a first features 210, a second features 212, third features 214, a fourth feature 216, a fifth feature 218 and a sixth feature 220. More or fewer features than these may be provided within pliable item 110. Some features may be used to define alignment lines, as further discussed below. Pliable item 110 may be formed by stacking different layers, shapes and materials. As a result, some features may be present, but in a slightly different location, as represented by features 214', 216' and 220' shown in FIG. 2. Additionally, pliable item 110 may be formed from multiple layers or panels of materials. FIG. 2 illustrates panel 230 having feature 218 therein. Panel 230 may be formed into pliable item 110 such as by cold pressing, hot pressing, gluing, or any of a number of known attachment schemes. The stacking of these layers, such as panel 230, may result in certain features having slightly varied positions. For example, the attachment process may result in shrinkage, shifting or other movement of panel 230, which could result in movement of feature 218. The system can account for these variations, as further described below.

Still referring to FIG. 2, a cutting system 160 may comprise a laser source on positioning system 170, such as an x-y table. As illustrated in the example of FIG. 2, an x-y table may provide a first support 263 and a second support 261. Support 261 may be moved along support 263 in an x direction 264 (along axis 162 of FIG. 1), while cutting system 160 may be moved in a y direction 262 along support 261 (along axis 164 of FIG. 1). However, other positioning systems may be used in accordance with the present invention beyond the basic x-y table illustrated in FIG. 2, such as various arms or booms.

Figure 3:
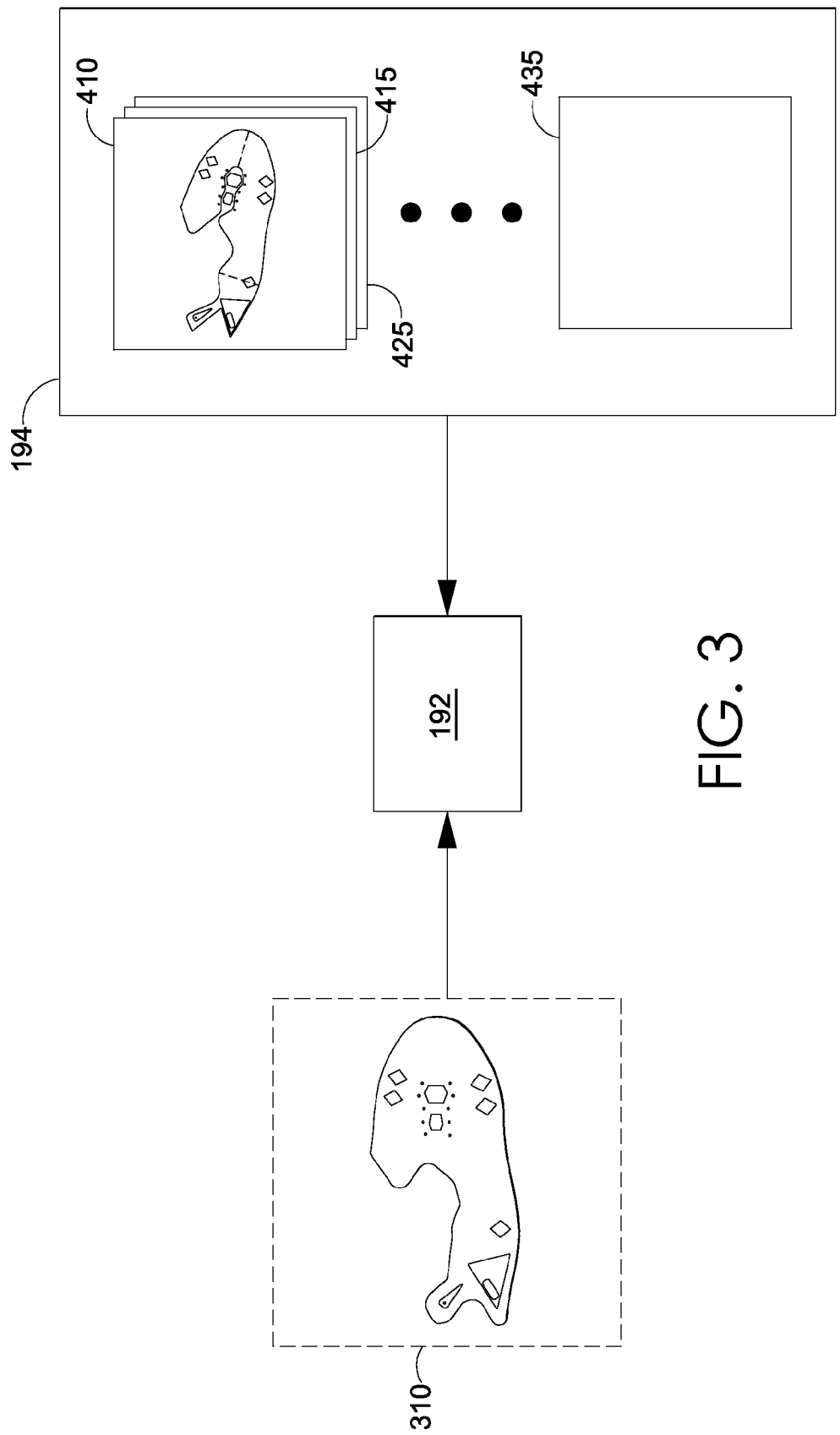
FIG. 3 illustrates an example of the comparison of the captured image of the pliable item with a stored pattern representation.

FIG. 3 illustrates an image 310 of the item 110 captured by camera 140. As shown in FIG. 3, captured image 310 is accessed by or delivered to processing unit 192. Processing unit 192 may then compare image 310 to a series of pattern representations retained within the pattern files 194. In the example illustrated in FIG. 3, the series of pattern representations are numbered 410, 415, 425, and 435, but any number of pattern files may be utilized. For example, different pattern representations may be provided for different components, different sizes of components, different colors or configurations of components, etc. Processing unit 192 may use one or more features, as described more-fully below, to identify the pattern representation that corresponds to image 310, and thus, pliable item 110. It is further contemplated that the corresponding pattern representation may be determined by other means than from image recognition, such as operator identification or item number identification, for example.

Figure 4:
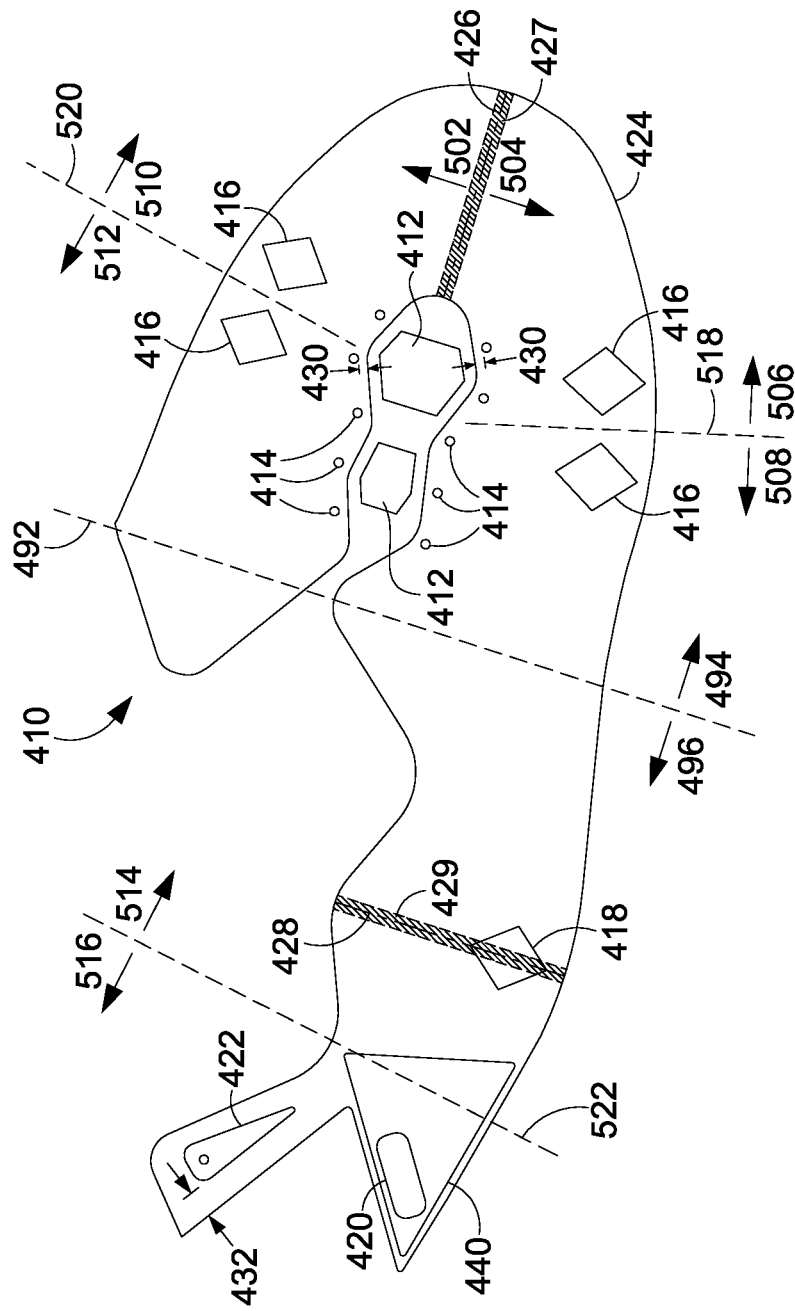
FIG. 4 illustrates an example of the identification of features in a pattern representation.

Referring now to FIG. 4, an example pattern representation 410 is shown. Pattern representation 410 is identified by processing unit 192 as corresponding to the image 310 and thus, pliable item 110. Pattern file 410 may define, for example, a series of critical pattern features, a desired cut path for the pattern, and distance tolerances between critical pattern features and one or more of the critical image features. The features shown in pattern 410 are merely exemplary and other pattern shapes, elements, alignment lines, and cut paths are within the scope of the inventive concepts disclosed herein. Pattern representation 410 is illustrated with features 412, 414, 416, 418, 420 and 422. The pattern representation 410 may also contain a preferred location for a panel 440. In identifying the pattern representation that corresponds to image 310, processing unit 192 compares one or more features of the various pattern representations 410, 420, 430 and 490 to one or more of the features 210-220 in the captured image 310 to aid in identifying a relationship between a pattern feature and an image feature. For example, by comparing a pattern feature with an image feature, the general spatial relationship of one or more pattern features and one or more image features may be determined to facilitate alignment of the pattern features with the image.

The pattern file 410 also defines a desired cut path 424 as well as distance tolerances between cut path 424 and one or more of image features associated with features 412-422. Exemplary exclusionary distance tolerances 430 and 432 are shown in FIG. 4. The final cut path, in an exemplary aspect, should be outside the area formed by these exclusionary distance tolerances.

In addition, the pattern may include one or more alignment lines. As shown in FIG. 4, image critical features that are associated with pattern critical features 412 or 414 may be used to define an image alignment line coordinating with the pattern front alignment line 426, and an image critical feature that is associated with the pattern feature 418 may be used to find an image alignment line coordinating with the pattern rear alignment line 428.

As shown in FIG. 4, front alignment line 426 is oriented generally perpendicular to rear alignment line 428. Having two perpendicular (or non-parallel) alignment lines defined aids in alignment of pattern 410 to captured image 310, as further discussed below. In contrast to the exclusionary distance tolerances 430, 432, the alignment lines 426, 428 (or other features) may be used to define inclusionary tolerance regions. As an example, inclusionary distance tolerance regions 427 and 429 are shown in FIG. 4 and defined by alignment lines 426 and 428. In such an inclusionary tolerance region, the calculated alignment line from the captured image 310 should, in an exemplary aspect, fall inside the tolerance region. As discussed more fully below with respect to FIGS. 5E and 5F, an inclusionary distance tolerance region may also be defined based upon additional features, as opposed to just alignment lines. As used herein, a feature may include an alignment line or other shapes, objects or items on the pattern representation, a calculated alignment line on a captured image, as well as a geometrically identifiable portion of a shoe portion in the captured image. It is contemplated that a pattern may include a pattern feature, such as an alignment line. Similarly, it is contemplated that a captured item may be analyzed to determine a feature, such as an alignment line that serves as an image critical feature. Therefore, it is contemplated that the pattern alignment line may have tolerances associated therewith that a determined image alignment line is intended to satisfy.

Generally, the features may be defined on regions or zones of the pattern representation 410. As an example, the line 522 defines a rear region indicated by arrow 516. Features 420 and 422 are located in this rear region. Similarly, the region between lines 522 and 492 defines a heel area or zone indicated by arrows 496 and 514. Feature 418 is located in this heel area. Note that panel 440 is located in both the rear and the heel region. A back region may be defined to include both of the rear region and the heel region.

A mid-lateral area is generally defined as bounded by lines 426 (virtually extending to line 492), 492 and 518, indicated by arrows 494, 504 and 508. One feature 416 and three features 414 are in this mid-lateral area. A mid-medial area is generally defined as bounded by lines 426 (virtually extending to line 492), 492 and 520, indicated by arrows 494, 502 and 512. One feature 416 and four features 414 are in this mid-medial area. A lateral toe box zone is defined by lines 426 and 518, indicated by arrows 504 and 506. One feature 416 and two features 414 are in this lateral toe box zone. Finally, a medial toe box zone is defined by lines 426 and 520, indicated by arrows 502 and 510. One feature 416 and one feature 414 are in this medial toe box zone. A front region may be defined to include the mid-lateral area, mid-medial area, lateral toe box area, and the medial toe box zone. Pattern representations could be divided into more and different regions, and those provided are merely exemplary. Note that some features, such as features 412, may cross multiple zones.

As briefly noted above, pattern representation 410 also defines exclusionary and/or inclusionary distance tolerances based upon one or more of the critical features 412-422 or the alignment lines 426, 428. For example, an exclusionary distance tolerance is indicated at 430 between feature 414, relating to an eyelet in a forward area, and the desired cut path 424. For example, the desired cut path 424 should be more than a certain distance from the eyelet to avoid quality and appearance issues with the final, formed product. As another example, the desired cut path 424 should be more than a certain distance 432 from feature 422 in the rearward area. As one example, and without limitation, the exclusionary distance tolerances from the defined critical features could be in the range of 3-5 millimeters.

Similarly, inclusionary distance tolerances may be defined. Exemplary inclusionary tolerance regions 427 and 429 are shown in FIG. 4, centered on alignment lines 426 and 428. As one example, and without limitation, the borders of the inclusionary tolerance regions could be in the range of 0.5 mm from the alignment lines 426, 428. Within image 310, the size of a feature, distance between features, etc. may be determined in various fashions, such as by calculating a size/distance using the known physical dimension corresponding to a pixel of image 310, which may depend in part on the distance between the pliable item and the camera when the image was captured. Other distance tolerances could, of course, be defined and used depending on the product. So, while specific examples of features and dimensions defined by pattern representation 410 are illustrated and described herein, no particular number or characteristics of features and their relative distribution within a pattern file is necessary for systems and methods in accordance with the present invention. It is contemplated that when a proposed cutline is inside an inclusionary tolerance zone and/or when the proposed cutline is outside of an exclusionary tolerance zone, the proposed cutline satisfies the at least one tolerance. Similarly, it is contemplated that when an alignment line is inside an inclusionary tolerance zone and/or when the alignment line is outside of an exclusionary tolerance zone, the alignment satisfies the at least one tolerance.

Figure 5B:
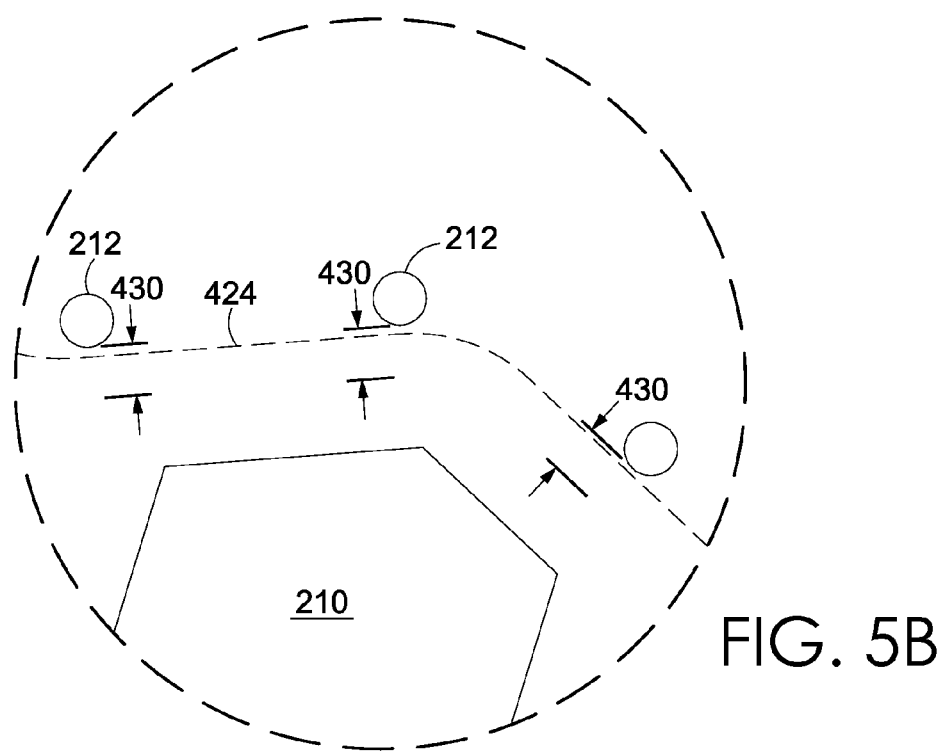
FIG. 5B illustrates an enlarged portion of the pattern representation.

Referring now to FIG. 5A, processing unit 192 overlays the desired cut path 424 of pattern representation 410 onto captured image 310. The pattern representation overlay may also include the alignment lines 426 and 428. As shown in FIG. 5B, the desired cut path 424 as overlaid on image 310 may initially result in a proposed cutting path that is outside the defined exclusionary distance tolerances. As shown in FIG. 5B, the initial cut path 424 is inside the exclusionary distance tolerance region 430. In this example, the features 212 serve as the critical image features from which the exclusionary distance tolerance region 430 is based. The initial cut path 424 serves as the critical pattern feature for which a determination of satisfying tolerances is based.

Figure 5C:
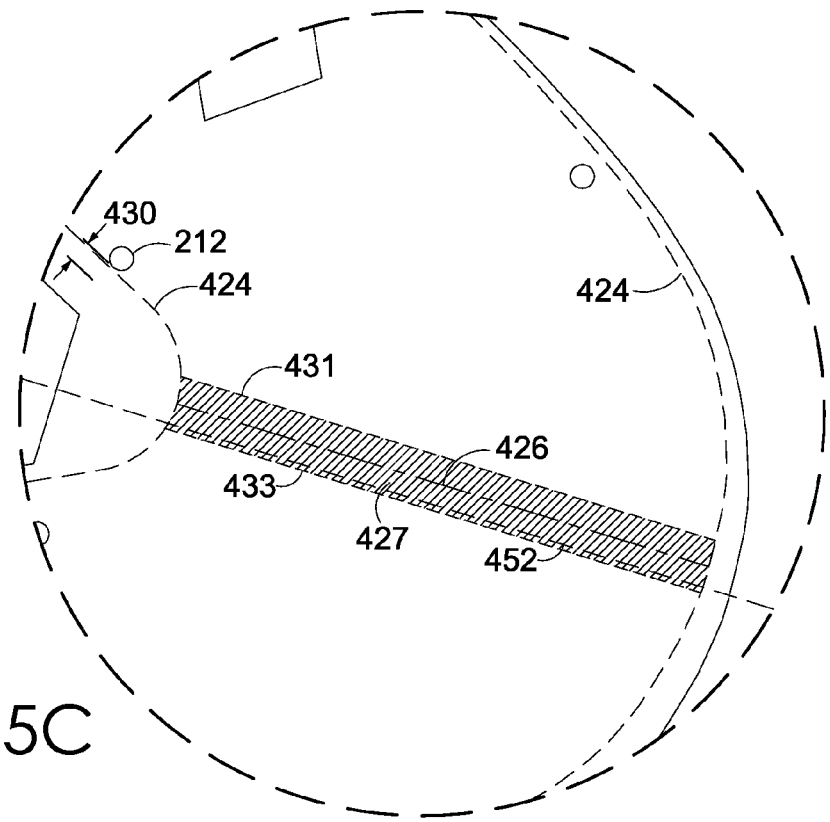
FIG. 5C illustrates an enlarged portion of the pattern representation.

A similar enlarged region is shown in FIG. 5C illustrating the comparison of front alignment line 426, which serves as a critical pattern feature, with an alignment line 452, which serves as a critical image feature, that is calculated based on features within captured image 310. As shown in FIG. 5C, alignment line 426 defines an inclusionary tolerance region 427 between boundaries 431 and 433. The calculated alignment line 452 should be inside the inclusionary tolerance region 427 to satisfy the tolerance associated with the calculated alignment line 452. Based on these comparisons, processor 192 or 196 creates an adjusted, final cut path such that the final cut path satisfies required distance tolerances, such that the cut path is not inside any required exclusionary distance tolerance region, and all required inclusionary tolerance regions are met. An image alignment line is "calculated" when one or more image features are identified and vision software analyzes the identified features to determine an appropriate location for an image alignment line to be located. For example, particular points of feature 210 as captured in the image may be identified by the vision software and a mathematical operation may be performed on those particular points to define a location for the image alignment line to located, as was done for the calculated alignment line 452 bisecting the feature 210.

Figure 5D:
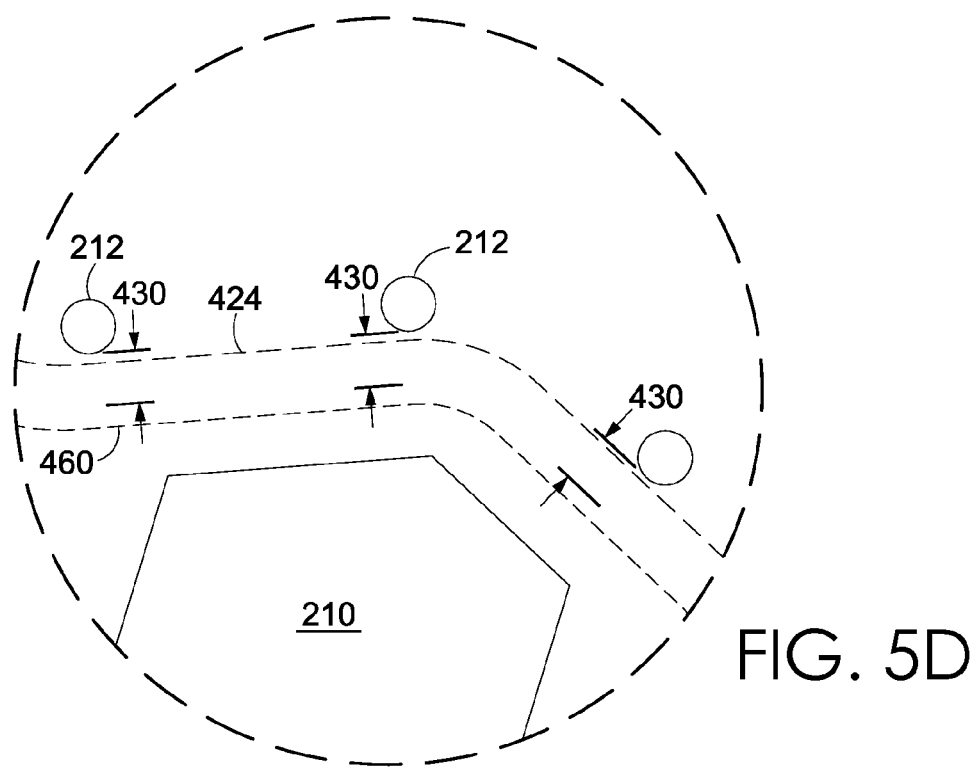
FIG. 5D is a view similar to FIG. 5B, showing an adjusted cut path.

As an example, the proposed cut path 424 shown in FIG. 5B is inside the exclusionary distance tolerance 430, and should therefore be adjusted. Processor 192 or 196 can adjust the cut path, as shown in FIG. 5D to a final adjusted cut path 460 that is outside the exclusionary distance tolerance 430. Therefore, the final adjusted cut path 460 satisfies at least the tolerance of the exclusionary distance tolerance 430.

Figure 5E:
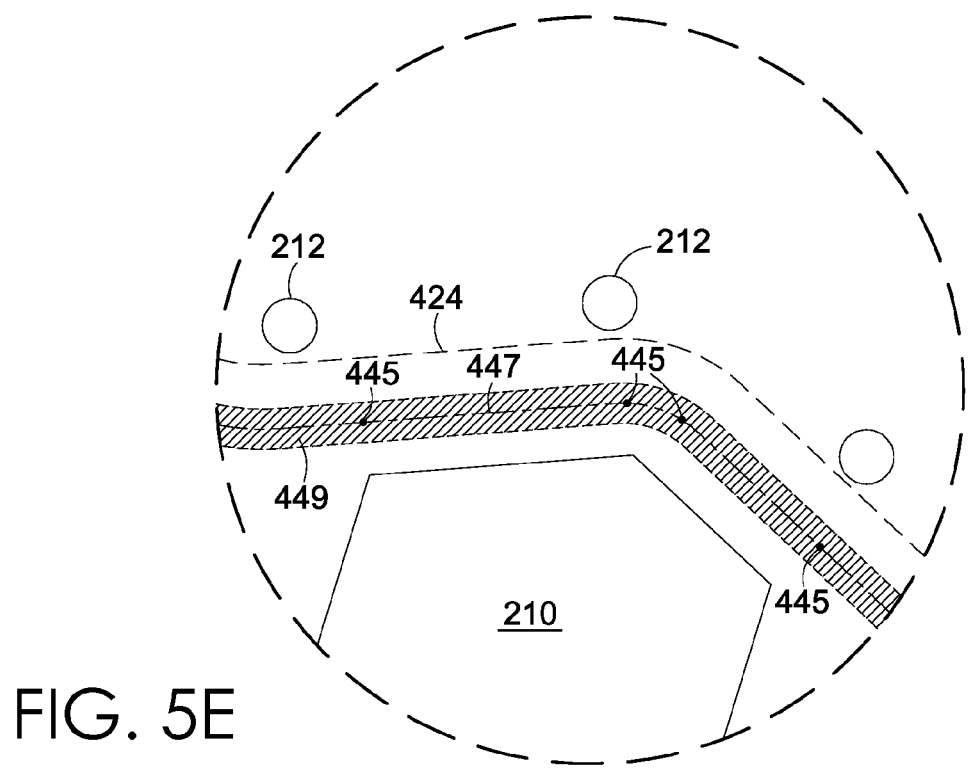
FIG. 5E is a view similar to FIG. 5B, showing an inclusionary tolerance region.
Figure 5F:
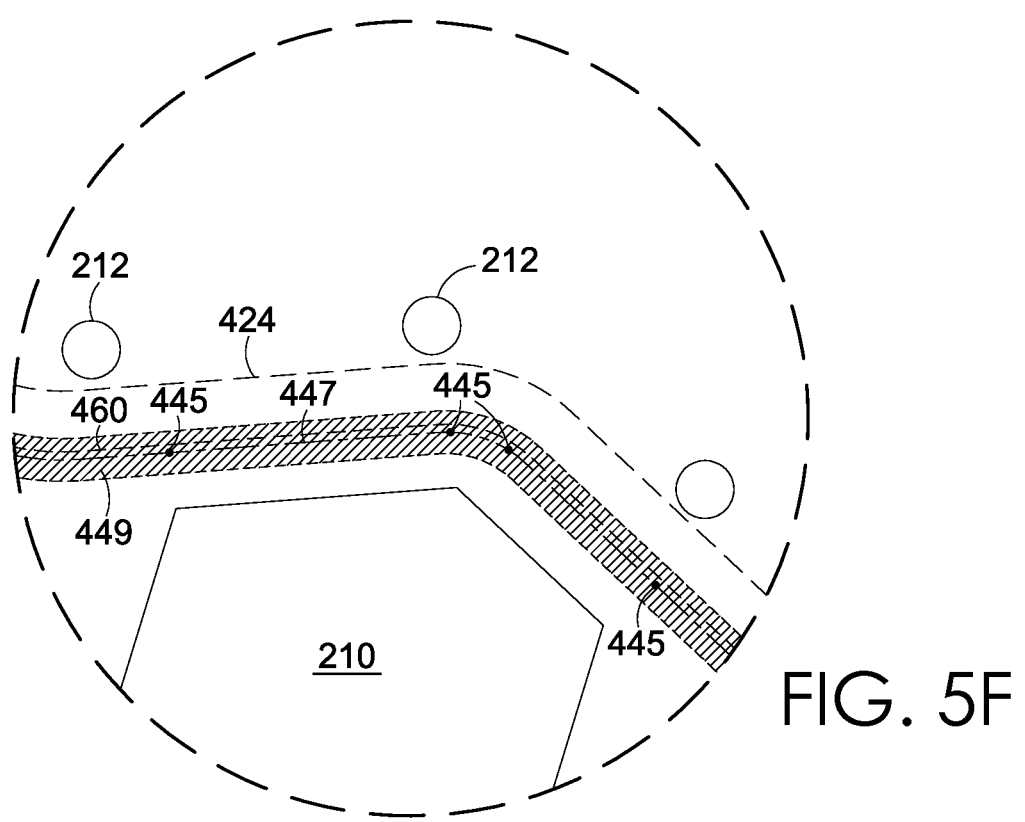
FIG. 5F is a view similar to FIG. 5E, showing an adjusted cut path.

In some instances, it may be beneficial to define an inclusionary tolerance region instead of, or in addition to, an exclusionary distance tolerance. As an example, as shown in FIG. 5E, feature 210, which is an example of a feature to be removed following the cutting operation, may be used to define an inclusionary tolerance region. To define the inclusionary tolerance region, points 445 may be established a certain distance from defined points on feature 210. It is contemplated that each of the points 445 may be defined as extending a different distance (a non-uniform distance) and/or a similar distance from the feature. Points 445 may then be used to define a center line 447 that forms the basis for an inclusionary tolerance region 449. As stated above, the tolerance region may be defined as 0.5 mm from the centerline 447, in an exemplary aspect, such as when the feature is an alignment line. It should be understood that other distances could be used, as well as other features, in defining inclusionary tolerance regions. The cut line 424 should be inside this inclusionary tolerance region 449, in an exemplary aspect. As can be seen from FIG. 5E, the initial proposed cut line 424 is not inside the region 449. Based on this comparison, processor 192 or 196 can adjust the cut path, as shown in FIG. 5F to a final adjusted cut path 460 that is inside the inclusionary tolerance region 449. As depicted in FIG. 5E, the inclusionary tolerance region 449 is based on a critical image feature associated with feature 210 such that the inclusionary tolerance region 449 is an offset distance from the feature. The proposed cut line 424 serves as the pattern critical feature that, in this example, fails to satisfy the tolerances.

FIG. 6 shows a representative adjusted final cut path 460. Adjustments to the cut path could include an alignment rotation, shift or offset of the cut path 424. While both exclusionary and inclusionary distance tolerances are discussed above, it should be understood that one or the other, or both could be used. Moreover, adjustments to the cut path could be based on tolerances defined by features that remain after cutting, such as features 212 or on features that are removed in the cutting process, such as feature 210. In an exemplary aspect, it is contemplated that an adjusted cut path remains the same size and shape as a proposed cut path; the difference between the adjusted and proposed cut paths is the orientation and position of the cut paths relative to the underlying article to be trimmed.

As noted above, pliable item 110 may be formed by stacking multiple layers on top of one another, and then fusing them together by gluing, hot pressing, cold pressing, etc. Such formation methods may result in certain layers being shifted relative to one another, or in one or more of the layers shrinking or otherwise changing shape or size. As one example, panel 230 may shrink, move or otherwise change shape or position in forming the pliable item 110. If such shrinkage or movement occurs, feature 218 may likewise move. The panel 230 and/or feature 218 may have an associated distance tolerance to the cut line that can be examined by processor 196, similar to the examination described above with respect to distance tolerances 430 and 432. The cut path can then be adjusted to account for such shrinkage or other movement. In this way, the system and method can account for and adjust to variations occurring in the positioning of critical features as a result of the stacking formation of pliable item 110.

In examining the critical features and distance tolerances, it may be advantageous to examine multiple features in multiple areas or zones. For example, and without limitation, processor 196 may examine the location of feature 220 in the rear area, features 212 in the mid-medial area and features 212 in the mid-lateral area. By examining multiple features in multiple areas, the system can take into account the variations occurring as a result of the stacking formation of pliable item 110. Further, it is contemplated that one or more features positioned in the back region may be evaluated as well as one or more features in the front region to account for the potential shrinkage in the longitudinal axis of the item to be trimmed.

In an exemplary aspect the critical features may be a functional feature of a shoe upper, such as an eyelet (e.g., eyelet feature 414) or location for an eyelet positioned near a forefoot opening that will be created by cutting along the final cut path. The tolerance zone ensures that the final cut path is a sufficient distance from each of the eyelets so that a desired amount of shoe upper material is maintained during the cutting process between an eyelet and a resulting forefoot opening. This maintained material between the eyelet and the forefoot opening is sufficient, in an exemplary aspect, at resisting a tearing force exerted on the eyelet by a lacing mechanism, such as a shoe lace. Therefore, the shifting, skewing, rotating, or otherwise adapting from the proposed cut path to a final cut path allows for a finished shoe upper to function as intended. Other features that are functional and/or aesthetic on a shoe upper are contemplated as being evaluated and considered for determining a final cut path. In addition, features that are removed during the cutting process may be used and considered in determining a final cut path.

An examination by processor 196 of one or more features for determining a final cut path may include a prioritization process to prioritize the location of certain features relative to the final cut line over other features. For example, as provided herein, certain features specifically or certain zones having features may be prioritized above other features or zones when determining a final cut path. For example, taking the example above, the processor 196 may evaluate features or zones associated with functional features, such as eyelets, initially. The processor may then, as a secondary priority, tune the final cut path based on secondary features, such as aesthetic features. In this logic, the processor 196 ensures that a first grouping of features (e.g., functional eyelets) satisfy a priority tolerance and a second grouping of features satisfy a less critical secondary tolerance, in an exemplary aspect.

Figure 7:
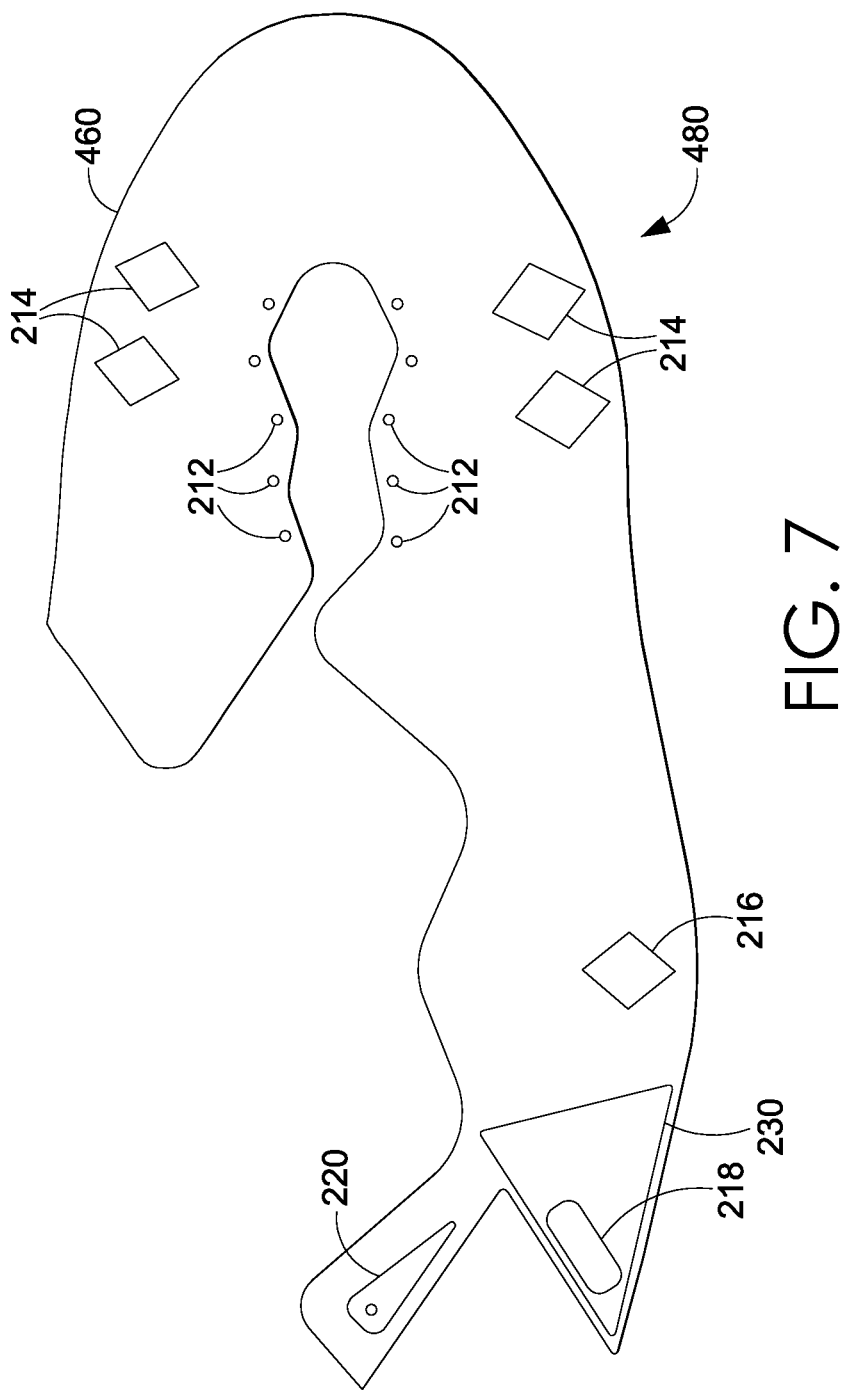
FIG. 7 illustrates an example of the pliable item after trimming along the generated final cut path.

After generating an adjusted, final cut path, the computing system 190 instructs the cutting system 160 and positioning system 170 to trim the pliable item 110 along the final cut path 460, resulting in a trimmed item 480, as shown in FIG. 7. Note that certain features of the pliable item 110 and features of the pattern representation 410 may not appear in the final trimmed item 480. As an example, features 210 (see FIG. 6) may be removed during the trimming step.

Not all features within pliable item 110 in image 310 need be treated the same in generating a final cutting path 460 by processor 196. In the example of a component of a shoe upper, critical features may comprise structural/functional elements, such as eyelets, or critically aesthetic components that must be maintained at a given location relative to the trimmed edge produced using a cutting path, and therefore given particular weight in the generation of a cutting path by a processing unit. As an example, as noted above, multiple features may be examined to determine the cut line. As an example, four of the eyelet features 414 on each side of alignment line 426 may be examined. Alternatively, different features in different regions or zones may be analyzed. For example, three different features in three different zones can be analyzed to determine the final cut path. In yet another example, an alignment line in the back region (or heel region in particular) may be analyzed in connection with an alignment line in the front region (or at the intersection of the medial toe box area and the lateral toe box area) to determine a final cut path.

While a laser may be particularly well suited cutting system for methods and systems in described herein, other cutting systems may be used. For example, a cutting die may be positionally and/or rotationally adjusted to engage and trim pliable item 110. Similarly, other cutting methods could be used, such as, for example, a drag knife or water-based cutting system. As discussed above, the trimming by a cutting system along a cut line may provide standardization to the final trimmed item when the un-trimmed items that serve as an input are variable in size, shape, and relative positioning of elements contained therein. Therefore, it is contemplated that the trimming system used is functional to provide a consistently sized and/or shaped trimmed item based on a variable input un-trimmed piece, which causes the final cut path to be rotated and/or shifted relative to the un-trimmed item input in a potentially unique manner for each of the inputs.

Figure 8:
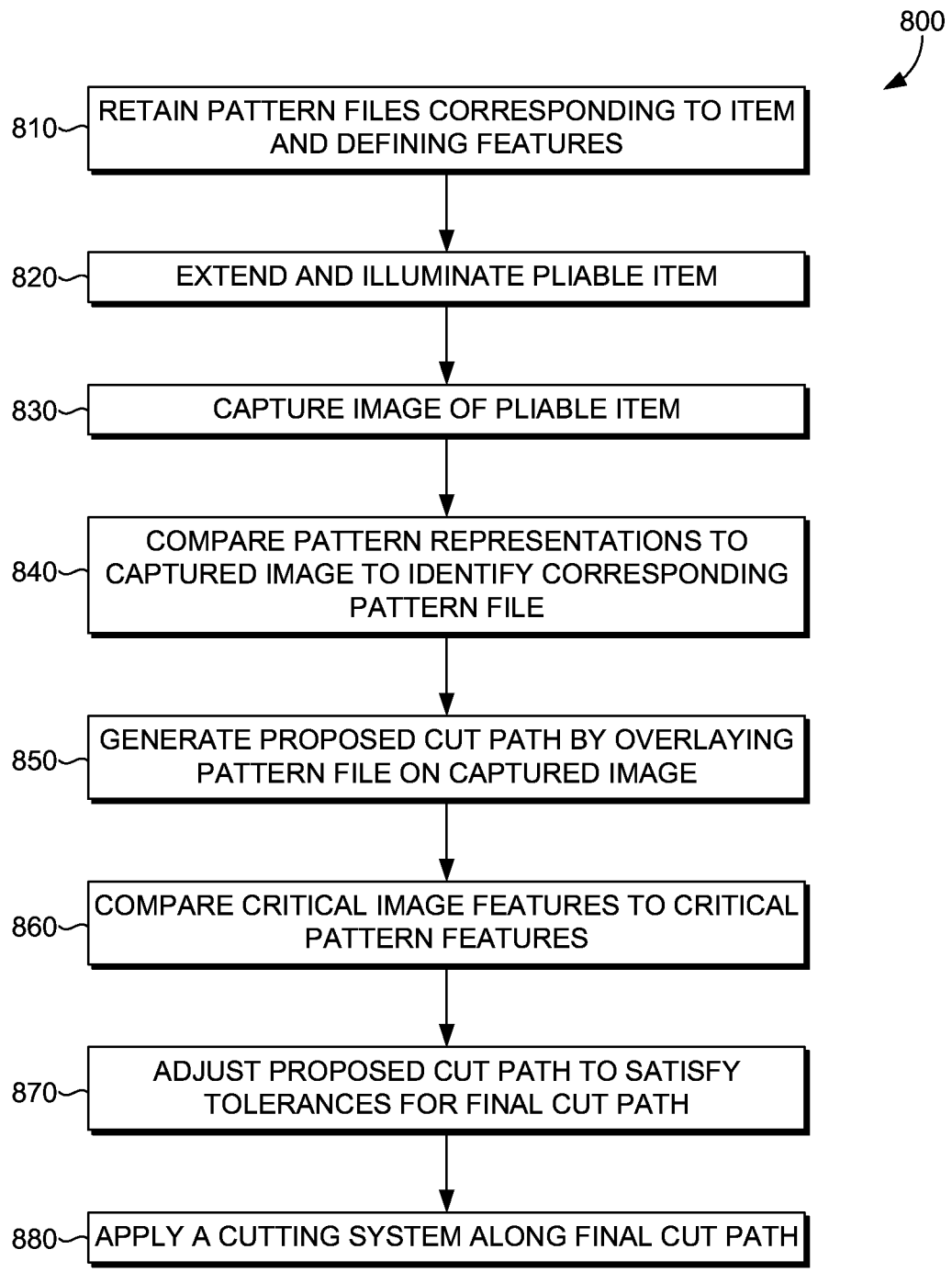
FIG. 8 illustrates an example of a method usable to automatically trim pliable items.

Referring now to FIG. 8, an example of a method 800 for trimming pliable items in accordance with the present invention is illustrated. As the method 800 is implemented in a manufacturing setting that is repeated for a plurality of inputs, it is contemplated that the method 800 is repeated for each new item that serves as an input. In step 810, a pattern representation or file may be retained in a computer readable memory. The pattern file retained in step 810 may define one or more features that may be expected to be found within the interior or on the perimeter of one or more pliable item. In step 820, one or more pliable items may be extended, for example on a retaining surface and illuminated. Suction or other applied forces may be used to retain a pliable item in an extended position. Step 820 may facilitate the subsequent capture of one or more images of the pliable items.

In step 830, images of the pliable item are captured using an image capturing device. In step 840, the pattern representations retained in step 810 are compared to the images captured in step 830 to locate features within the pliable items shown in the images. In step 850, a proposed cut path may be generated based upon features located in the images captured in step 830 using the pattern files retained in step 810. More specifically, step 850 overlays a pattern representation onto the captured image to generate a proposed cut path. The pattern representation may include one or more critical pattern features, such as a cut line or an alignment line. In step 860, critical image features of the captured image are compared to the critical pattern features. In this comparison, the distance between one or more of the critical image features and the critical pattern features, such as the proposed cut path is compared to a predetermined distance tolerance. If needed, the proposed cut path is adjusted in step 870 to satisfy the distance tolerances to generate a final cut path. If the proposed cut path satisfies the distance tolerances, then the proposed cut path become the final cut path. Steps 810-870 are carried out within programmed computer software and executed by processing units 192 or 196.

Finally, in step 880, a cutting system may be applied along the extended pliable item along the generated cutting path to trim the pliable item. The cutting system applied in step 880 may comprise a laser beam projected by a laser source, a cutting water jet applied from a water nozzle, a cutting die, a drag knife, or any other cutting system.

Systems and methods in accordance with the present invention may be used to trim a pliable item, such as components of a shoe upper. Systems and methods in accordance with the present invention may trim a pliable item to permit the trimmed item to meet size, shape, or other tolerances required for future processing and/or assembly of the pliable item into a finished product, to prevent fraying, etc. Systems and methods in accordance with the present invention may be used, for example, to trim cut pliable items that have been preliminarily cut to an approximate size and shape needed to eliminate a potentially fraying edge and to meet the tolerances needed for subsequent assembly. In some examples, pliable items may comprise individual components for assembly into a shoe upper. While the term "shoe" has be used herein, it should be understood that the term "shoe" can be any article of footwear, such as a shoe, boot, sandal or the like.

Having thus described the invention, what is claimed is:
1. A system for removing unwanted portions of pliable items, the system comprising:
an image capturing device operable to capture an image of a pliable item;
a processor coupled to the image capturing device that identifies at least one critical image feature within the captured image of the pliable item, the at least one critical image feature usable to identify at least one pattern representation corresponding to the pliable item;

a computer-readable memory retaining the at least one pattern representation corresponding to the pliable item, the pattern representation identifying:
(1) the pliable item,
(2) at least one critical pattern feature associated with the pliable item, the at least one critical pattern feature identifying one or more critical image features expected to be found in the captured image of the pliable item, and
(3) a corresponding proposed cut path for the pliable item based at least in part upon the identified at least one critical pattern feature;

a processing system that overlays the proposed cut path onto the captured image and compares a distance between the at least one critical image feature and the at least one critical pattern feature to a predetermined distance tolerance, and generates an adjusted final cut path that satisfies the predetermined distance tolerance; and a cutting system moveable along the generated final cut path to trim the pliable item along the final cut path.

2. The system for removing unwanted portions of pliable items of claim 1, further comprising:
a retaining surface that holds the at least one pliable item in a substantially planar orientation to expose a surface of the pliable item to the image capturing device; and
a lighting system that illuminates the at least one pliable item held by the retaining surface while the image capturing device captures at least one image of the pliable item.

3. The system for removing unwanted portions of pliable items of claim 2, wherein the cutting system comprises at least one laser.

4. The system for removing unwanted portions of pliable items of claim 3, wherein the at least one laser is positionable on an x-y table allowing movement of the laser along at least two axes substantially parallel to the retaining surface, along the cutting path.

5. The system for removing unwanted portions of pliable items of claim 4, wherein the pattern representation has a front region and a back region, and wherein the at least one critical pattern feature is located in the front region of the pattern representation.

6. The system for removing unwanted portions of pliable items of claim 5, wherein a second critical pattern feature is located in the rear region of the pattern representation.

7. The system for removing unwanted portions of pliable items of claim 6, wherein the at least one critical pattern feature located in the front region is a front alignment line and the second critical feature is a rear alignment line.

8. The system for removing unwanted portions of pliable items of claim 7, wherein the lighting system comprises at least one light source with a spectrum selected to reflect from the at least one feature of the cut pliable item to be identified.

9. A method for trimming a pliable item used in forming an article of footwear, the method comprising:
capturing at least one image of the pliable item while in a relatively planar orientation;
in a processing unit, locating a pattern retained in a computer readable memory system, the pattern corresponding to the at least one captured image and identifying at least one critical pattern feature that corresponds to at least one critical image feature expected to be found in the captured image of the pliable item;
in the processing unit, generating a proposed trimming path for the pliable item based upon the pattern;
in the processing unit, comparing the proposed trimming path to at least one distance tolerance between the at least one critical pattern feature and the corresponding at least one critical image feature, and adjusting the proposed trimming path to a final trimming path such that the final trimming path satisfies the at least one distance tolerance; and
applying a cutting device to the pliable item along the final trimming path.

10. The method for trimming a pliable item used in forming an article of footwear of claim 9, wherein the pattern identifies at least two critical image features, and wherein the comparing further comprises, comparing the proposed trimming path to an exclusionary distance tolerance associated with each of the critical image features, and adjusting the proposed trimming path to a final trimming path such that the final trimming path is within the both distance tolerances.

11. The method for trimming a pliable item used in forming an article of footwear of claim 10, wherein one of the at least two critical image features is in a front region of the pliable item, and the other critical image feature is in a back region of the pliable item.

12. The method for trimming a pliable item used in forming an article of footwear of claim 11, wherein the critical image feature in the front region corresponds to the location of an eyelet hole for the article of footwear.

13. The method for trimming a pliable item used in forming an article of footwear of claim 10, wherein the exclusionary distance tolerances are in a range of 3-5 millimeters.

14. The method for trimming a pliable item used in forming an article of footwear of claim 9, further comprising using a feature in a forward region to calculate a front alignment line as a critical image feature, and using a feature in a back region to calculate a rear alignment line as a critical image feature, wherein the front and rear alignment lines are substantially perpendicular to one another.

15. A system for trimming pliable pieces of a shoe upper, the system comprising:
an image capturing device operable to capture at least one image of a pliable piece to be used to form a shoe upper;
a processing device operably coupled to the image capturing device and programmed to analyze the captured image and to identify at least one critical image feature of the pliable piece, the at least one critical image feature usable to identify at least one pattern representation corresponding to the pliable piece;
a computer-readable memory retaining the at least one pattern representation corresponding to the pliable piece, the pattern representation usable to identify:
(1) the pliable piece,
(2) at least one critical pattern feature associated with the pliable piece, the at least one critical pattern feature identifying one or more critical image features expected to be found in the captured image of the pliable piece, and
(3) a corresponding proposed cut path for the identified pliable piece based at least in part upon the identified at least one critical pattern feature and overlaid onto the captured image;

a processing device programmed to compare a distance between the at least one critical image feature and the at least one critical pattern feature to a predetermined distance tolerance, and to create an adjusted final cut path satisfying the distance tolerance; and a cutting system moveable along the final cut path to trim the pliable item along the final cut path.

16. The system for trimming pliable pieces of a shoe upper of claim 15, further comprising a retaining platform that holds at least one pliable piece of a shoe upper in an extended and substantially horizontal position.

17. The system for trimming pliable pieces of a shoe upper of claim 16, wherein the retaining platform further comprises a vacuum mechanism that exerts a force on the pliable piece of a shoe upper to maintain the pliable piece of a shoe upper in an extended position on the retaining platform.

18. The system for trimming pliable pieces of a shoe upper of claim 17, wherein the cutting system is a laser moveable along the cut path.

19. The system for trimming pliable pieces of a shoe upper of claim 18, further comprising a positioning device that changes the vertical position of the laser and the retaining platform while the laser source applies a laser beam to the pliable piece of a shoe upper along the generated cut path to maintain the vertical distance between the laser and the pliable piece of the shoe upper within a predetermined range.

20. The system for trimming pliable pieces of a shoe upper of claim 19, further comprising a light source positioned above the retaining platform operable to illuminate the at least one pliable piece of a shoe upper held on the retaining platform and emitting a spectrum of light corresponding to the spectrum reflected by at least a portion of the pliable piece.

* * * * *